United States Patent [19]

Yamanaka

[11] Patent Number: 4,789,790

[45] Date of Patent: Dec. 6, 1988

[54] DIGITAL EQUIPMENT

[75] Inventor: Torao Yamanaka, Hyogo, Japan

[73] Assignee: Mitsubishi Denki Kabushiki Kaisha, Tokyo, Japan

[21] Appl. No.: 888,417

[22] Filed: Jul. 23, 1986

[30] Foreign Application Priority Data

Oct. 3, 1985 [JP] Japan .................. 60-220524
Mar. 3, 1986 [JP] Japan .................. 61-44004

[51] Int. Cl.$^4$ .............................................. H02J 7/00
[52] U.S. Cl. ........................................ 307/66; 307/64; 307/87; 307/44; 363/15; 363/16
[58] Field of Search ............... 307/6, 58, 82, 64, 66, 307/33, 31, 361, 44, 362, 87, 85; 363/15, 16; 328/66, 67, 77, 78, 74; 320/37, 38, 31; 361/18, 86, 87, 88, 89, 90, 91, 92, 93, 94

[56] References Cited

U.S. PATENT DOCUMENTS

| | | | |
|---|---|---|---|
| 3,414,802 | 12/1968 | Harrigan et al. | 307/44 X |
| 3,428,864 | 2/1969 | Barber et al. | 361/90 |
| 3,703,648 | 11/1972 | Wrabel | 361/88 X |
| 3,749,944 | 7/1973 | Luebrecht | 307/362 |
| 3,757,131 | 9/1973 | Krutz et al. | 307/66 X |
| 3,775,675 | 11/1973 | Freeze et al. | 361/94 X |
| 3,778,634 | 12/1973 | Hanrihan | 307/64 |
| 3,801,794 | 4/1974 | Mauch et al. | 307/66 |
| 3,916,212 | 10/1975 | Prochazka et al. | 307/66 |
| 3,935,511 | 1/1976 | Boulanger et al. | 361/92 X |
| 4,091,434 | 5/1978 | Suzuki et al. | 363/15 X |
| 4,122,359 | 10/1978 | Breikss | 307/66 X |
| 4,246,633 | 1/1981 | Borkovitz | 307/66 X |
| 4,274,122 | 6/1981 | Hansen et al. | 361/91 X |
| 4,315,162 | 2/1982 | Ferguson | 307/66 |
| 4,401,895 | 8/1983 | Petkovsek | 307/66 |
| 4,426,587 | 1/1984 | Nouet | 307/150 X |
| 4,429,236 | 1/1984 | Nitschke | 307/362 |
| 4,520,418 | 5/1985 | Susi | 361/88 X |
| 4,542,433 | 9/1985 | Schaefer et al. | 361/92 |
| 4,611,126 | 9/1986 | Miller | 307/64 |

FOREIGN PATENT DOCUMENTS 0093417 6/1982 Japan .................. 363/15
0108970 6/1983 Japan .................. 363/15

OTHER PUBLICATIONS

Electronic Communication Society, "Electronic Communication Handbook", 1979, title pages & pp. 1305-1306.

Primary Examiner—William M. Shoop, Jr.
Assistant Examiner—Paul Ip
Attorney, Agent, or Firm—Bernard, Rothwell & Brown

[57] ABSTRACT

Digital equipment such as an electronic computer comprises a memory unit, an operation unit and a processing unit. In the digital equipment, a short-time service interruption compensation means in compact and simple constitution is installed within a power conversion circuit, and a timer circuit to halt each of the equipment in case of service interruption for a long time is provided as a runaway preventing safety means for the equipment. A power conversion device of the digital equipment is composed of a rectifier circuit which rectifies the commercial power source voltage, a battery as a service interruption compensation means which performs floating charge of the rectifier circuit output and discharges the charged DC power source so as to treat service interruption of the commercial power source, and a DC to DC conversion circuit which converts DC current from the rectifier circuit at normal state or from the battery during service interruption in DC-DC conversion. The timer circuit prevents each part relating to electronic computer function from improper operation due to runaway in case of service interruption longer than the charging capacity of the battery, and transmits a halt instruction to each part if the service interruption time extends beyond a definite time.

7 Claims, 4 Drawing Sheets

DIGITAL EQUIPMENT

BACKGROUND OF THE INVENTION

1. Field of the Invention

The present invention relates to digital equipment such as an electronic computer having a service interruption compensation means which compensates input during service interruption.

2. Description of the Prior Art

In general, in digital equipment such as an electronic computer, electric power must be supplied thereto continuously. Consequently, for abnormal state of the power system such as service interruption, various service interruption compensation means, for example, a battery, a flywheel power source apparatus and the like, are provided.

Digital equipment such, as an electronic computer in almost cases uses an external input power source—for example, a commercial power source of single phase AC 100 V or three-phase AC 200 V in Japan—, and in order to supply the external input to various logical circuits of the digital equipment stably there is provided an internal power unit which converts the AC input into DC stabilized output.

In the prior art, as an example of a system where the external input power source is used and DC stabilization is performed by the internal power source unit as above described, a "power supply system" is disclosed in "Handbook for Electronics and Communication Engineers" edited by the Institute of Electronics and Communication Engineers of Japan and published by Ohm-sha Ltd., p. 1305–1306.

Referring to a block connection diagram of FIG. 1, the power supply system comprises a power conversion device 10 installed within digital equipment 1 such as an electronic computer. Lead wires of a commercial power source 101 are connected to the power conversion device 10 from outside of the digital equipment 1, and internal wirings to supply stabilized DC output 102 are connected to each part of an internal circuit (not shown) of the digital equipment 1.

Next, operation will be described. A power switch is first turned on, thereby the commercial power source 101, e.g., AC 100 V, 50 Hz, is transformed and converted into DC 12 V in the power conversion device 10 installed within the digital equipment 1, which voltage is supplied to each part of the circuit of the digital equipment 1. Thus the digital equipment 1 acts to perform operation and processing of data for a definite object according to a prescribed program.

Since such digital equipment 1 reads a program stored in a memory and performs. the data processing in sequence, if a service interruption of the commercial power source 101 occurs, normal operation based on the above-mentioned program cannot be performed during the interruption. Consequently, after the service recovery, the data processing may still remain stopped an abnormal operation, for example, runaway state of the circuit, may be produced.

In recent years, as shown in FIG. 2, an uninterruptible power supply system 2 having a rectifier circuit 21, a battery 22 and an inverter circuit 23 is installed outside the digital equipment 1, where DC voltage is supplied from the battery 22 to the inverter circuit 23 during service interruption of the commercial power source 101, and further voltage of DC-AC conversion by the inverter circuit 23 is supplied to the power conversion device 10. According to this constitution, even if a service interruption of the commercial power source occurs, the power supply to the digital equipment 1 can be continued through the inverter 23 so that abnormal or runaway state of the operation due to the service interruption can be effectively prevented.

In this digital equipment 1, however, since the uninterruptible power supply system 2 of large scale to compensate the service interruption must be provided separately from the digital equipment, this constitution becomes uneconomical.

The uninterruptible power supply system 2 is usually provided with a complicated wave shaping circuit to output sinusoidal AC voltage; thereby increase of the cost is inevitable and the efficiency is reduced.

Furthermore, in case that service interruption state continues longer than the compensation time of the battery, the above-mentioned digital equipment cannot perform the normal operation based on the program, and after the service recovery the data processing may still remain stopped or runaway state of the circuit may be produced.

SUMMARY OF THE INVENTION

First object of the invention is to provide digital equipment wherein, in view of improvement of reliability of commercial power source in recent years, the constitution is made compact and simple, and at the same time the manufacturing cost is reduced.

Second object of the invention is to provide digital equipment wherein, although in the prior art in spite of DC conversion by the power conversion device within the digital equipment such as an electronic computer the complicated wave shaping circuit must be installed to output sinusoidal AC voltage from the uninterruptible power supply system, wasteful facilities based on above-mentioned situation may be omitted and the power supply is made efficient.

Third object of the invention is to provide digital equipment wherein, in case of service interruption longer than the compensation time of the battery, operation based on the program is halted thereby improper operation after the service recovery can be prevented.

In digital equipment according to the invention, a power conversion device is composed of a rectifier circuit for rectifying commercial power source voltage, a battery for charging the output of the rectifier circuit and compensating the short-ime service interruption, and a DC to DC converter for converting the output of the rectifier circuit in DC-DC conversion, and when service interruption longer than the service interruption compensation time of the battery is detected, a time circuit connected to the commercial power source halts the operation of the digital equipment by the detecting output.

The power conversion device in the invention is of small capacity so as to treat the service interruption of a short time produced from aspect of the power system operation in the battery which is charged by the commercial power source after rectification. The battery together with the rectifier circuit and the DC to DC converter may be enclosed within the digital equipment integrally and in compact constitution, thereby this is favorable also in economic and space viewpoints. Furthermore, in case that the service interruption becomes longer than the service into compensation time of the battery, the operation is halted by a timer circuit and improper operation is prevented.

DETAILED DESCRIPTION OF THE PREFERRED EMBODIMENTS

Preferred embodiments of the invention will now be described in detail referring to the accompanying drawings.

Figure 1:
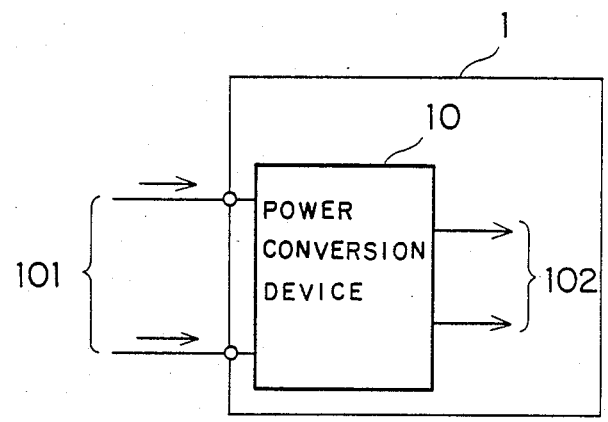
FIG. 1 is a block connection diagram of digital equipment with a power conversion device in the prior art.
Figure 2:
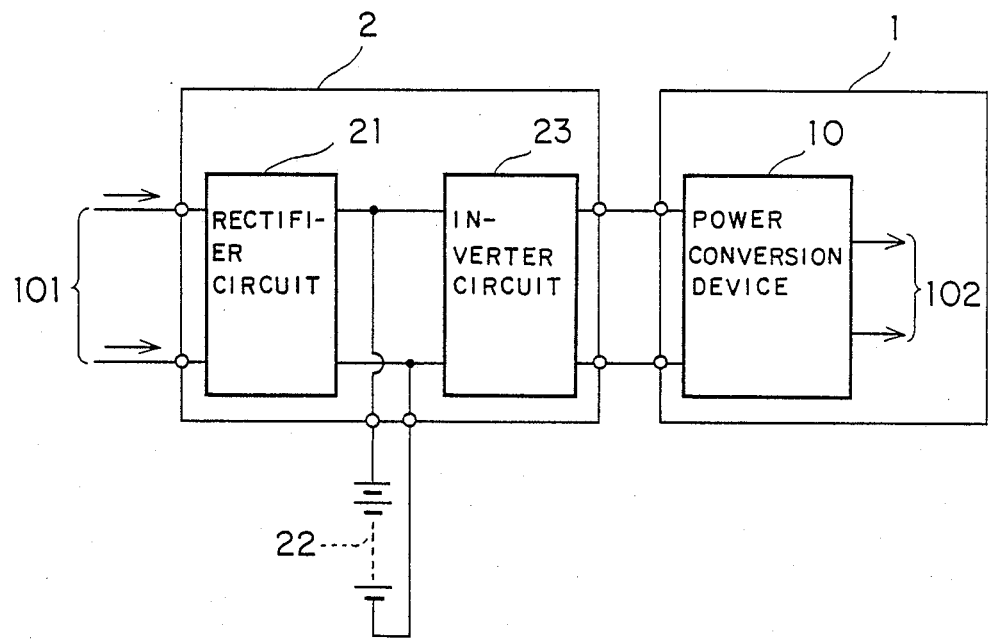
FIG. 2 is a block connection diagram of digital equipment to which an external service interruption compensation device is connected in the prior art.
Figure 3:
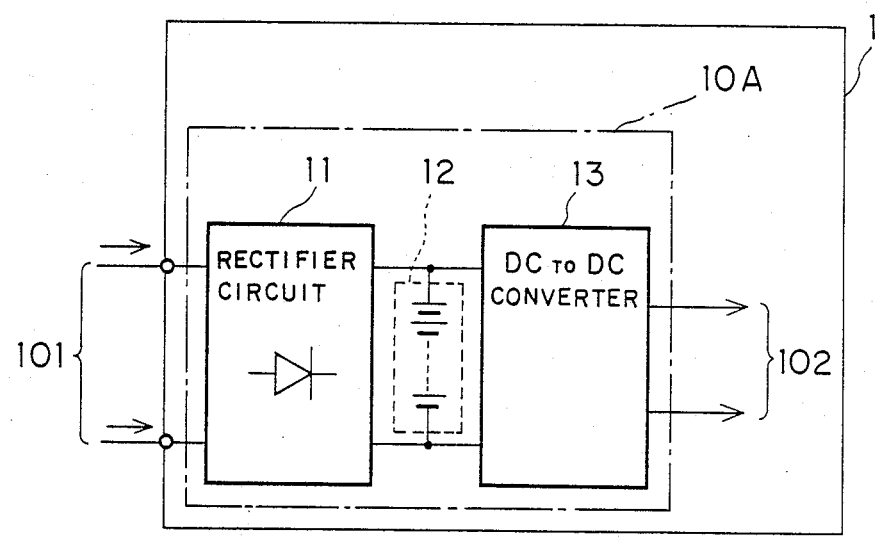
FIG. 3 is a block connection diagram of digital equipment with a power conversion device having an internal service interruption compensation circuit as an embodiment of the invention.

FIG. 3 shows digital equipmet as an embodiment of the invention, comprising a power conversion device 10A having an internal service interruption compensation circuit. The power conversion device 10A is composed of a rectifier circuit 11 for rectifying commercial power source 101, e.g., AC 100 V, a battery 12 of small capacity—so as to treat service interruption of a short time—for performing floating charge of DC current rectified by the rectifier circuit 11, and a DC to DC converter 13 which converts the DC current rectified by the rectifier circuit 11 into AC current and then converts the AC current into DC current again.

Next, operation of the power conversion device 10A in above-mentioned constitution will be described.

When power supply of the commercial power source 101 is performed normally, DC current rectified by the rectifier circuit 11 is supplied to the DC to DC converter 13, where the DC current is converted into AC current and then the AC current is converted into DC current again, thereby DC stabilized output 102 is supplied to a memory unit, an operation unit and a processing unit (not shown) of the digital equipment. On the other hand, the battery 12 performs floating charge of the DC current supplied from the rectifier circuit 11 to the DC to DC converter 13, and the charging is performed to the upper limit value of the charging capacity while the commercial power source 101 is continued to be supplied normally.

The power system may produce service interruption of quite a short time from viewpoints of protection and operation, such as fail-safe function. When the commercial power source 101 is interrupted for quite a short time, the battery 12 charged during the normal operation as above described discharges the charged power, and the DC stabilized output 102 is supplied by the discharged power of the battery 12 through the DC to DC converter 13 to the memory unit, the operation unit and the processing unit (not shown) of the digital equipment 1.

As above described, even if service interruption occurs in the commercial power source 101, the DC stabilized output is continuously outputted until the service is recovered and supply of the normal commercial source 101 is started again; thereby the digital equipment 1 can continue the normal operation based on the program stored in the memory unit (not shown) and runaway of the circuit can be prevented.

Since the battery 12 may be of small capacity so as to treat service interruption of a short time, it can be readily installed within the digital equipment 1 although the service interruption compensation device of large scale must be separately installed in the prior art.

Furthermore, since the digital equipment 1 need not be enlarged but accessory facilities may be reduced without changing the conventional size, the equipment as a whole is made compact and simple in the appearance and the excellent equipment can be obtained from the viewpoint of good appearance.

Figure 4:
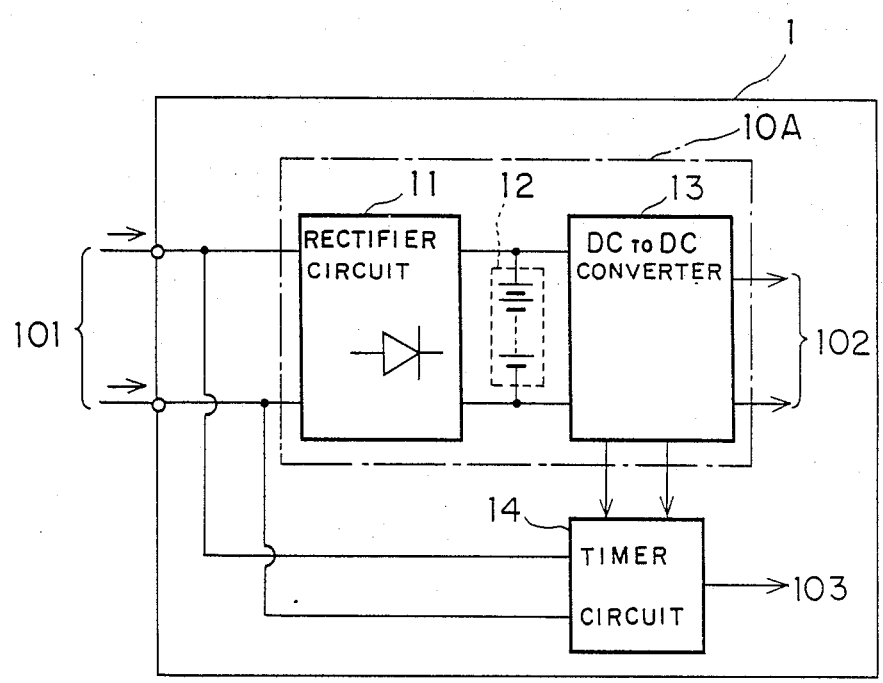
FIG. 4 is a block connection diagram of digital equipment having a power conversion device together with a timer circuit as another embodiment of the invention.
Figure 5:
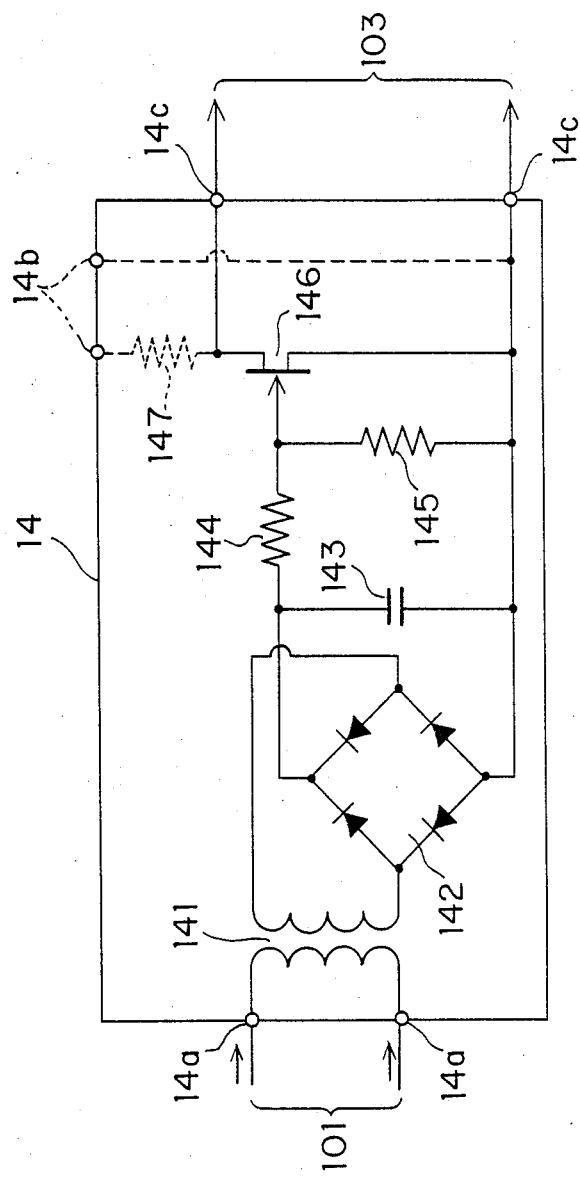
FIG. 5 is a circuit diagram of the timer circuit in FIG. 4 illustrating the embodiment in detail.

Next, digital equipment as another embodiment of the invention, will. be described referring to FIGS. 4 and 5.

The whole constitution of the embodiment will be first described referring to FIG. 4. In FIG. 4, parts which are the same as or similar to those in FIG. 3 are designated by the same reference numerals and the overlapped description shall be omitted. Internal wirings which connect the commercial power source 101 to the rectifier circuit 11 of the power conversion device 10A are connected also to a timer circuit 14, and service interruption of the commercial power source 101 is detected by the connecting wires to the timer circuit 14.

FIG. 5 shows a circuit constitution of the timer circuit 14 in detail. As seen from FIG. 5, the timer circuit 14 comprises an isolation transformer 141 installed at rear side of terminals 14a to which the commercial power source 101 is connected, a rectifier circuit 142 composed of a plurality of diodes for rectifying current transformed by the transformer 141, a capacitor 143 for charging the rectified current, resistors 144, 145 for voltage dividing, and a field effect transistor (FET) 146 where the divided voltage is applied to the gate. The FET 146 is constituted so that, when service interruption occurs in the commercial power source 101 and voltage is not applied to the gate, power source from the DC to DC converter 13 is supplied to the FET 146 through terminals 14b and a resistor 147; thereby voltage is outputted to output terminals 14c.

The timer circuit 14 in above-mentioned constitution acts as follows. The commercial power source 101 applied to the input terminals 14a, 14a is transformed by the transformer 141 and rectified by the rectifier circuit 142, and output of the rectifier stack 142 charges the capacitor 143 and is divided by the resistors 144 and 145. The divided voltage is applied to the gate of the FET 146 and renders the FET 146 conductive. Consequently, the timer output 103 is outputted from the output terminals 14c, 14c and the timer circuit 14 becomes normally conductive.

Next, operation of the digital equipment 1 will be described.

As shown in FIG. 4, the commercial power source 101 is rectified in the rectifier circuit 11. The rectified DC power is floating charged to the battery 12, and at the same time it is inputted to the DC to DC converter 13 where the input power is converted into required stable DC output of definite level, and the DC output is supplied to each circuit of the digital equipment 1.

In such circuit, when service interruption occurs not for a long time beyond the capacity of the battery 12 but for quite a short time from aspects of protection and operation of the power system, the discharge power of the battery 12 sufficiently charged before the service interruption is supplied to the DC to DC converter 13 still after the service interruption and until the service is recovered and the normal commercial power source 101 is started. Consequently, the digital equipment 1 can continue the normal operation based on the program stored in the memory unit.

In case of the service interruption for a long time, charge which has been charged in the capacitor 143 of the timer circuit 14 is discharged through the resistors 144 and 145, and when the gate voltage of the field effect transistor 146 becomes less than the cut-off voltage, the field effect transistor 146 is turned off and hence both output terminals 14c, 14c which are connected to the drain and source of the field effect transistor (FET) 146, become interrupted.

Consequently, if the output terminal 14c is connected to the HALT terminal of the central processing unit (CPU) of the digital equipment 1 and the halt state occurs at the interruption state of the output terminal 103, the central processing unit can be halted after a definite time from the service interruption and operation of the digital equipment can be halted; thereby runaway state as produced in the prior art can be prevented.

Since the time period of the timer circuit 14 can be arbitrarily set by the time constant according to capacitance of the capacitor 143 and the resistors 144 and 145, if it is set slightly shorter than the compensation time of the battery 12 in FIG. 4 the indefinite operation after lapse of the compensation time of the battery 12 can be suppressed.

In the description of the above-mentioned embodiment, in order to halt the operation of the digital equipment 1, the output terminal 103 of the timer circuit 14 is connected to the HALT terminal of the central processing unit so that the central processing unit is halted at the interruption state of the output terminal 103; thereby the operation of the digital equipment 1 is halted. However, as another method to halt the operation of the digital equipment 1, a gate may be installed to the control output circuit of the digital equipment 1, and the output terminal 14c of the timer circuit 14 may be connected to the gate so that the gate is disabled by the output of the timer circuit 14.

As above described in detail, in the digital equipment according to the invention, the service interruption compensation means with the battery is installed within the power conversion device, and the timer circuit is installed incidental to the service interruption compensation means so as to halt the operation of the memory unit, the operation unit and the processing unit by the compensation power source to respective units in case of the service interruption for a long time. Thereby the digital equipment has several effects as follows.

First effect is that even if the service interruption occurs for a short time (e.g., about 10 seconds) in the commercial power source, since DC voltage of definite level can be still supplied stably from the battery as the internal service interruption, compensation means through the DC to DC converter to each part of the digital equipment, the constitution can be made compact and simple and the manufacturing cost of the digital equipment can be reduced.

Second effect is that although the uninterruptible power supply system of external installation type in the prior art must be provided with the wave shaping circuit or the like when DC voltage of the battery is converted into AC voltage by the DC-AC inverter and the AC voltage is outputted to the power conversion device of the digital equipment, since such circuit may be omitted in the digital equipment of the invention, wasteful facilities need not be installed and the power supply can be performed efficiently.

Third effect is in that the timer circuit is installed incidental to the internal service interruption compensation means so as to lock the operation of various units of the digital equipment, such as the operation unit, the processing unit performed on the basis of the program stored in the memory unit in case of the service interruption for a long time, even if the service interruption occurs for a long time the operation of each part is halted and improper operation such as abnormal or runaway state can be prevented in the digital equipment.

What is claimed is:

1. Digital equipment comprising a power conversion device wherein a commercial AC power source is converted to a DC power voltage by the power conversion device, and the DC power voltage is used as a power source for operation of the digital equipment, said power conversion device comprising:
a rectifier circuit for rectifying the commercial power source voltage to produce a rectified voltage on an output of the rectifier circuit;
a battery connected across the output of the rectifier circuit as a short-time service interruption compensation means for being charged by rectified current from the rectifier circuit and for supplying DC voltage based on the charging so as to overcome short-time interruption of the commercial AC power source; and
a DC to DC conversion circuit connected across the output of the rectifier circuit and across the battery for converting DC current from the rectifier circuit or from the battery into the DC power voltage used as the power source for operation of the digital equipment;
said digital equipment further comprising a timer circuit connected to the commercial AC power source for halting operation of at least part of the digital equipment based on detecting continuing interruption of the commercial AC power source for a predetermined short-time period which is less than a service interruption compensation discharge time of the battery.

2. Digital equipment as set forth in claim 1, wherein said power conversion device supplies the operating power to an electronic computer function unit comprising a memory unit in which a prescribed program is stored, an operation unit for performing a prescribed operation, and a processing unit for holding temporarily the operation content or outputting the operation content out of the equipment.

3. Digital equipment as set forth in claim 1, wherein said DC to DC conversion circuit comprises a DC to DC converter which converts DC current from the rectifier circuit or the battery into AC current, and then converts the AC current into DC current again so as to output a stable DC output of predetermined voltage level to each part of the equipment.

4. Digital equipment as set forth in claim 1, wherein said power conversion device comprising the rectifier circuit, the battery and the DC to DC conversion circuit; said electronic computer function unit comprising the memory unit, the operation unit and the processing unit; and said timer circuit are enclosed within a compact casing in one package.

5. Digital equipment as set forth in claim 1, wherein said timer circuit comprises a first input terminal with a detecting line connected to the commercial power source, a transformer which transforms the commercial AC power source supplied to the first input terminal, a rectifier circuit which rectifies current transformed by the transformer, a capacitor which charges power rectified by the rectifier circuit, dividing resistors which divide the power source voltage rectified by the rectifier circuit, a field effect transistor where the voltage divided by the dividing resistors is applied to the gate thereof, a second input terminal to which the power voltage is supplied from the DC to DC conversion circuit, and output terminals connected respectively to the drain and the source of the field effect transistor.

6. Digital equipment as set forth in claim 5, wherein said timer circuit is constituted so that when AC power supply to the first input terminal is stopped on the basis of service interruption of the commercial AC power source, the charge on the capacitor is discharged over the predetermined short-time period until the voltage applied to gate of the field effect transistor by the dividing resistors becomes less than the transistor cut-off voltage, whereupon the field effect transistor is turned off and both output terminals of the timer circuit become interrupted to halt at least part of the digital equipment due to the interrupted state between both output terminals of the timer circuit.

7. Digital equipment comprising a power conversion device wherein a commecial AC power source is converted to a DC power voltage by the power conversion device, and the DC power voltage is used as a power source for operation of the digital equipment, said power conversion device comprising:
  a rectifier circuit for rectifying the commercial AC power source voltage to produce a rectified voltage on an output of the rectifier circuit;
  a battery connected across the output of the rectifier circuit as a short-time service interruption compensation means for being charged by rectified current from the rectifier circuit and for supplying DC voltage based on the charging so as to overcome short-time interruption of the commercial AC power source; and
  a DC to DC conversion circuit connected across the output of the rectifier circuit and across the battery for converting DC current from the rectifier circuit or from the battery into the DC power voltage used as the power source for operation of the digital equipment;
  said digital equipment further comprising a gate in an output circuit of the digital equipment, and a timer circuit for outputting a signal based on a detecting signal of a detecting line connected to the commercial AC power source to disable the gate of the output circuit of the equipment.

* * * * *

UNITED STATES PATENT AND TRADEMARK OFFICE
CERTIFICATE OF CORRECTION

PATENT NO. : 4,789,790

DATED : December 6, 1988

INVENTOR(S) : Torao Yamanaka

It is certified that error appears in the above-identified patent and that said Letters Patent is hereby corrected as shown below:

Column 1, line 18, delete the comma ",";
          line 59, before "an" insert --or--.
Column 2, line 49, "short-ime" should be --short-time--;
          line 53, "a time" should be --a timer--;
          line 67, "into" should be --interruption.
Column 4, line 17, delete the comma ","; after "will" delete the ".";
          line 49, "stack" should be --circuit--.
Column 5, line 14, after "14c" (second occurrence) insert a comma --,--;
          line 60, delete the comma ",".
Column 6, line 9, "lock" should be --halt--.

Signed and Sealed this

Twenty-sixth Day of December, 1989

*Attest:*

JEFFREY M. SAMUELS

*Attesting Officer*     *Acting Commissioner of Patents and Trademarks*